US012638103B2

(12) United States Patent
Lu et al.

(10) Patent No.: US 12,638,103 B2
(45) Date of Patent: May 26, 2026

(54) VACUUM SWITCHING VALVE AND SUCTION SYSTEM USING VACUUM SWITCHING VALVE

(71) Applicant: FUZHUN PRECISION TOOLING (JIASHAN) CO., LTD., Jiaxing (CN)

(72) Inventors: Xue-Yang Lu, Kunshan (CN); Jin-Feng Zhang, Kunshan (CN); Huo-Zhong Wu, Kunshan (CN); Hao Yang, Kunshan (CN); Sheng-Rong Zhang, Kunshan (CN); Ben Wu, Kunshan (CN); Guang-Ke Suo, Kunshan (CN); Xiao-Jin Zhong, Kunshan (CN); Nian Liu, Kunshan (CN)

(73) Assignee: FUZHUN PRECISION TOOLING (JIASHAN) CO., LTD., Jiaxing (CN)

( * ) Notice: Subject to any disclaimer, the term of this patent is extended or adjusted under 35 U.S.C. 154(b) by 442 days.

(21) Appl. No.: 18/283,102

(22) PCT Filed: Nov. 19, 2021

(86) PCT No.: PCT/CN2021/131764
§ 371 (c)(1),
(2) Date: Sep. 20, 2023

(87) PCT Pub. No.: WO2023/087249
PCT Pub. Date: May 25, 2023

(65) Prior Publication Data
US 2024/0151323 A1 May 9, 2024

(51) Int. Cl.
B25B 11/00 (2006.01)
F16K 27/02 (2006.01)
F16K 51/02 (2006.01)

(52) U.S. Cl.
CPC ............ *F16K 51/02* (2013.01); *B25B 11/005* (2013.01); *F16K 27/02* (2013.01)

(58) Field of Classification Search
CPC ......... B25B 11/00; B25B 11/005; B23Q 3/00; B23Q 3/06; B23Q 3/067; B23Q 3/088; F16K 51/02; F16K 7/17; F16K 39/026
See application file for complete search history.

(56) References Cited

U.S. PATENT DOCUMENTS 3,451,423 A * 6/1969 Priese ................. F16K 31/1225
251/63.5
4,723,767 A * 2/1988 McPherson ............... B25B 5/12
269/228
(Continued)

FOREIGN PATENT DOCUMENTS

CN 202507074 U 10/2012
CN 202927134 U 5/2013
(Continued)

*Primary Examiner* — Lee D Wilson
(74) *Attorney, Agent, or Firm* — ScienBiziP, P.C.

(57) ABSTRACT

A vacuum switching valve and a suction system having the same. The vacuum switching valve comprises: a valve body, comprising a first end and a second end, the second end being provided with an air inlet, an air outlet and a through hole; a valve element movably arranged in the valve body; a cylinder, the cylinder being connected to the first end and the valve element, the cylinder drives the valve element to move in the valve body, to close or open the air inlet; a stopper passing through the through hole, the stopper comprising a third end and a fourth end, the third end being connected to the valve element, the fourth end being located on the side of the through hole away from the valve element.

16 Claims, 6 Drawing Sheets

(56)     References Cited

U.S. PATENT DOCUMENTS

| | | | | |
|---|---|---|---|---|
| 5,996,984 | A * | 12/1999 | Takahashi | B25B 5/16 269/228 |
| 7,806,393 | B2 * | 10/2010 | Hara | B25B 5/087 294/203 |
| 11,835,142 | B2 * | 12/2023 | Chien | F16K 39/026 |
| 2010/0044942 | A1 * | 2/2010 | Tamai | B25B 5/122 269/228 |
| 2013/0341550 | A1 * | 12/2013 | Fukano | F16K 31/1221 251/331 |
| 2016/0123491 | A1 * | 5/2016 | Chiba | F16K 31/1221 156/345.24 |
| 2020/0300383 | A1 * | 9/2020 | Doi | F16K 1/54 |
| 2022/0275871 | A1 * | 9/2022 | Ishibashi | F16K 31/1221 |
| 2024/0151323 | A1 * | 5/2024 | Lu | B25B 11/005 |

FOREIGN PATENT DOCUMENTS

| | | | |
|---|---|---|---|
| CN | 203051843 | U | 7/2013 |
| CN | 105215701 | A | 1/2016 |

* cited by examiner

100

30

31

32

10

121

122

200

300

VACUUM SWITCHING VALVE AND SUCTION SYSTEM USING VACUUM SWITCHING VALVE

FIELD

The present disclosure relates to a technical field of negative pressure equipment, particularly to a vacuum switching valve and a suction system using the vacuum switching valve.

BACKGROUND

When an industrial product is processed by CNC machine tool, the product is adsorbed and fixed on a fixture by a negative pressure equipment. When the processing process is completed and the product needs to be removed, a vacuum switching valve is needed to break a vacuum airway and make it connected to outside environment in order to remove the processed product.

In actual production process, the processing of the product will produce fine debris, and the intake pipeline connected in the existing vacuum switching valve is easy to be blocked by debris and dust, and the entire negative pressure path needs to be closed before the intake pipeline is disassembled and repaired during equipment maintenance, which has the defect of complicated process and reduced production efficiency.

SUMMARY

The present application discloses a new vacuum switching valve and a suction system using the vacuum switching valve to solve the above problems.

In one embodiment of the present application, the vacuum switching valve includes a valve body, a valve element, a cylinder, and a stopper. The valve body includes a first end and a second end arranged opposite to each other, and the second end is provided with an air inlet, an air outlet, and a through hole. The valve element is movable and arranged in the valve body. The cylinder is connected to the first end and the valve element, and the cylinder is used to drive the valve element to move within the valve body to close or open the air inlet. The stopper passes through the through hole. The stopper includes a third end and a fourth end arranged opposite to each other. The third end is connected to the valve element. The fourth end is located on a side of the through hole away from the valve element. The fourth end is used to close or open the through hole. When the valve element moves to drive the fourth end to close the through hole, the air inlet is opened, and the air outlet is communicated with the air inlet. When the valve element moves to drive the fourth end to open the through hole, the valve element closes the air inlet, and the air outlet is communicated with the through hole.

In one embodiment, the valve body is provided with an intake channel, an outlet channel, and a connection channel. The intake channel is connected with the air inlet and the valve body. The outlet channel is connected with the air outlet and the valve body. The connection channel is connected with the outlet channel and the through hole.

In one embodiment, the stopper is moved between a first position and a second position. When the stopper is moved to the first position, the intake channel is communicated with the outlet channel, and the through hole is blocked by the stopper. When the stopper is moved to the second position, the valve element blocks the intake channel, and the outlet channel is communicated with the outside environment through the through hole.

In one embodiment, when the stopper is moved to the first position, a maximum distance between the valve element and the intake channel in a first direction is 2 mm-3.5 mm.

In one embodiment, the valve element includes a gasket, the gasket is arranged on a side of the valve element near the second end of the valve body.

In one embodiment, the valve element includes a first sealing ring, the first sealing ring is sleeved on a periphery of the valve element, and the first sealing ring abuts against an inner wall of the valve body.

In one embodiment, the valve body includes a second sealing ring, the second sealing ring is arranged at the through hole, and the second sealing ring abuts against the stopper.

An embodiment of the present application provides a suction system, including at least one adsorption device, at least one vacuum switching valve, a negative pressure tank, a silencer cylinder, and a solenoid valve. The at least one vacuum switching valve is connected with the at least one adsorption device. The negative pressure tank is connected with the vacuum switching valve, and the negative pressure tank is provided with a compressing air port for compressing air to enter the negative pressure tank. The silencer cylinder is arranged between the negative pressure tank and the vacuum switching valve. The solenoid valve is arranged at the compressing air port for controlling the entry of compressed air.

In one embodiment, the suction system includes a pressure monitoring device, the pressure monitoring device is connected to the negative pressure tank and the solenoid valve for controlling a pressure in the negative pressure tank.

In one embodiment, the silencer cylinder includes a cylinder body, a vacuum generator, a first sound insulation element, a second sound insulation element, a sound insulation layer, and a muffler. The cylinder body includes a first end portion and a second end portion arranged opposite to each other. The vacuum generator is arranged in the cylinder body and near the first end portion. The silencer cylinder defines an intake hole and an outlet hole, the intake hole and the outlet hole are connected with the vacuum generator. The first sound insulation element is arranged in the cylinder body and covers the vacuum generator. The second sound insulation element is arranged in the cylinder body and near the second end portion. The sound insulation layer is arranged between the first sound insulation element and the second sound insulation element. The muffler is arranged at an outer side of the second end portion of the cylinder body.

The vacuum switching valve discloses in the present application realizes the isolation treatment of the vacuum switching valve by closing the air inlet through the movable valve element, which is conducive to the isolation maintenance of the intake channel of the vacuum switching valve without closing the entire negative pressure path, and improves versatility and convenience of the valve.

In the suction system disclosed in the present application, by using the improved vacuum switching valve, the vacuum adsorption devices in different sections can be isolated for maintenance, simplifying the maintenance and cleaning processes, and improving stability and convenience of the system.

DESCRIPTION OF MAIN COMPONENTS OR ELEMENTS

Figure 1:
FIG. 1 is a schematic view of a vacuum switching valve according to an embodiment of the present disclosure.

Vacuum switching valve 100,
Valve body 10,
First end 11,
Second end 12,
Air inlet 121,
Air outlet 122,
Through hole 123,
First cavity 13,
Second cavity 14,
Intake channel 15,
Outlet channel 16,
Connection channel 17,
Second sealing ring 18,
Valve element 20,
Gasket 21,
First sealing ring 22,
Cylinder 30,
First air connector 31,
Second air connector 32,
Stopper 40,
Third end 41,
Fourth end 42,
Suction system 200,
Adsorption device 300,
Adsorption fixture 310,
Robot arm 320,
Negative pressure tank 400,
Compressing air port 410,
Silencer cylinder 500,
Cylinder body 510,
First end portion 511,
Second end portion 512,
Intake hole 513,
Outlet hole 514,
First sound insulation element 515,
Second sound insulation element 516,
Sound insulation layer 517,
Vacuum generator 520,
Muffler 530,
Solenoid valve 600,
Pressure monitoring device 700.

DETAILED DESCRIPTION

The technical scheme in the embodiments of this application will be clearly and completely described in combination with the drawings attached to the embodiments of this application. Obviously, the embodiments described are only part of the embodiments of this application, but not all embodiments.

It should be noted that when a component is said to be "fixed" to another component, it may be directly on other component, or it may also be indirectly on other component.

When a component is considered to be "connected" to another component, it may be directly connected to another component or be indirectly connected to another component. When a component is considered to be "set" on another component, it may be set directly on the other component or there may be indirectly on another component. The terms "vertical," "horizontal," "left," "right," and similar expressions used herein are for illustrative purposes only.

Unless otherwise defined, all technical and scientific terms used herein have the same meaning as those normally understood by skilled persons belonging to the technical field of this application. The terms used herein in the specification of this application are for the purpose of describing specific embodiments only and are not intended to restrict this application.

Figure 2:
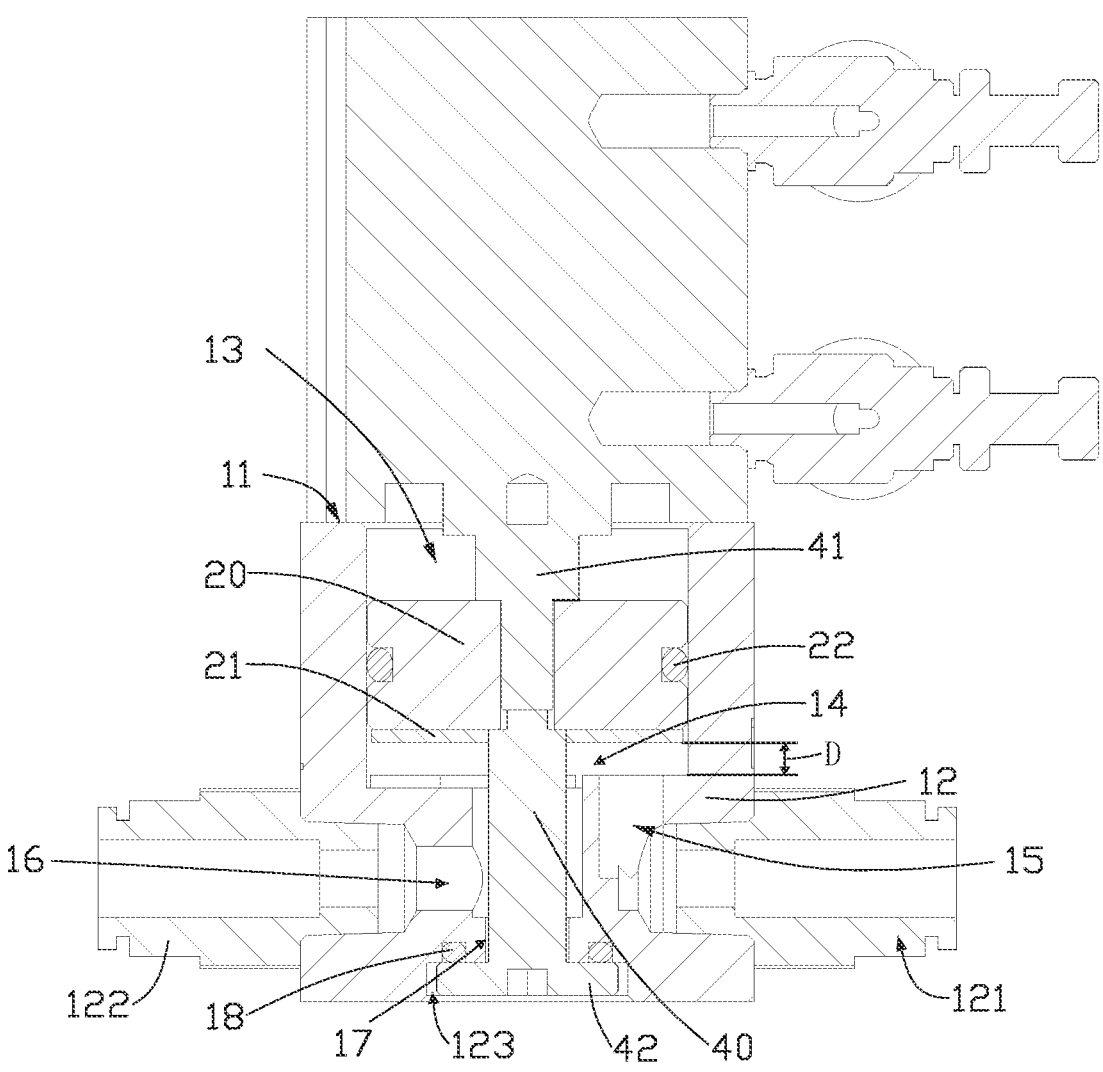
FIG. 2 is a cross-sectional view of an internal structure of the vacuum switching valve in FIG. 1.

Referring to FIG. 1 and FIG. 2, a first embodiment of the application provides a vacuum switching valve 100 including a valve body 10, a valve element 20, a cylinder 30, and a stopper 40. The valve body 10 includes a first end 11 and a second end 12 arranged opposite to each other. The second end 12 is provided with an air inlet 121, an air outlet 122, and a through hole 123. The valve element 20 is movable and arranged in the valve body 10, and an inner cavity of the valve body 10 is divided into a first cavity 13 and a second cavity 14 by the valve element 20. The cylinder 30 is connected to first end 11 and valve element 20, and the cylinder 30 is used to drive valve element 20 to move in the cylinder body 10 to close or open the air inlet 121. The stopper 40 passes through the through hole 123. The stopper 40 includes a third end 41 and a fourth end 42 arranged opposite to each other. The third end 41 is connected to the valve element 20, the fourth end 42 is located on a side of the through hole 123 away from the valve element 20, and the fourth end 42 is used to close or open the hole 123. When the valve element 20 moves to drive the fourth end 42 to close the through hole 123, the air inlet 121 is open, and the air outlet 122 connects to air inlet 121. When the valve element 20 moves to drive the fourth end 42 to open the through hole 123, the valve element 20 closes the air inlet 121, the air outlet 122 is communicated with the through hole 123.

It should be noted that cylinder 30 controls the opening and closing of the valve body 10 by driving the valve element 20. The second cavity 14 is communicated with the air inlet 121 and the air outlet 122 to form a vacuum path. When the valve element 20 continues to move down until a volume of the second cavity 14 is minimum, the vacuum path is blocked, thus achieving the effect of vacuum switching.

In an embodiment, an intake channel 15, an outlet channel 16, and a connection channel 17 are provided in the valve body 10. The intake channel 15 is connected with the air inlet 121 and the valve body 10. The outlet channel 16 is connected with the air outlet 122 and the valve body 10. The connection channel 17 is communicated with the outlet channel 16 and the through hole 123.

It should be noted that the air inlet 121 is configured to connect a negative pressure device. The intake channel 15 and the outlet channel 16 are communicated to the second cavity 14, forming a vacuum path for providing negative pressure to a device connected at the air outlet 122. The connection channel 17 is communicated to the second cavity 14 and through hole 123. A connection portion between the connection channel 17 and the second cavity 14 is close to a connection portion between the outlet channel 16 and the second cavity 14. A diameter of the intake channel 15 is not less than 2.5 mm, and a diameter of the outlet channel 16 is not less than 2.5 mm, so that the air path is not easy to block.

In one embodiment, the stopper 40 is moved between a first position and a second position, when the stopper 40 is moved to the first position, the intake channel 15, the second cavity 14, and the outlet channel 16 are communicated and form a path, and the through hole 123 is blocked by the stopper 40. When the stopper 40 is moved to the second position, the valve element 20 blocks the path formed by the intake channel 15, the second cavity 14, and the outlet channel 16, and the outlet channel 16 is communicated with the outside environment through hole 123.

In one embodiment, when the stopper 40 is in the first position, that is, when the stopper 40 and the valve element 20 are at an uppermost position, the vacuum path formed by the intake channel 15, the second cavity 14, and the outlet channel 16 is unimpeded, a negative pressure forms at the air outlet 122. When the stopper 40 is in the second position, that is, the stopper 40 and the valve element 20 are in a lowest position, the volume of the second cavity 14 is compressed, the intake channel 15 is blocked by the valve element 20, and the vacuum path formed by the intake channel 15, the second cavity 14, and the outlet channel 16 is blocked. At this time, the connection channel 17 is communicated with the second cavity 14 and the outside environment, and the negative pressure in the vacuum path is emptied and restored to normal pressure, thereby facilitate disassembly and maintenance of the vacuum switching valve 100.

In one embodiment, when the stopper 40 is moved to the first position, a maximum distance D between the valve element 20 and the intake channel 15 in a first direction is 2 mm to 3.5 mm, and 2.5 mm is adopted in this embodiment. The first direction is a vertical direction in FIG. 2. When intake channel 15 is communicated with the outlet channel 16, the maximum distance D with large size can effectively avoid the dust and debris blocking a space between the valve element 20 and the intake channel 15 during working process, thereby improving the stability of the vacuum switch valve 100.

In one embodiment, the valve element 20 includes a gasket 21, the gasket 21 is arranged on a side of the valve element 20 near the second end 12 of the valve body 10. When the stopper 40 is in the second position, the valve element 20 is moved downward to the lowest position, at this time, the valve element 20 is abuts against the second end 12 through the gasket 21, the gasket 21 can improve the airtightness and reduce the damage caused by the collision between valve element 20 and valve body 10 during operation, and improve the service life of the vacuum switching valve 100.

In one embodiment, the valve element 20 further includes a first sealing ring 22, the first sealing ring 22 is sleeved on a periphery of the valve element 20, and the first sealing ring 22 abuts against an inner wall of the valve body 10. The first sealing ring 22 is wrapped around a middle portion of the valve element 20, and the middle portion of the valve element 20 correspondingly defines a groove for receiving the first sealing ring 22. The first sealing ring 22 is configured to isolate the first cavity 13 and the second cavity 14, improve the sealing performance while reducing friction between the valve element 20 and the valve body 10, and improve the service life of the vacuum switching valve 100.

In one embodiment, the valve body 10 includes a second sealing ring 18, the second sealing ring 18 is arranged at the through hole 123, and the second sealing ring 18 is configured to abut against the stopper 40. The second sealing ring

18 can improve the sealing performance between the stopper 40 and the valve body 10, to avoid vacuum leakage in a working state.

Figure 3:
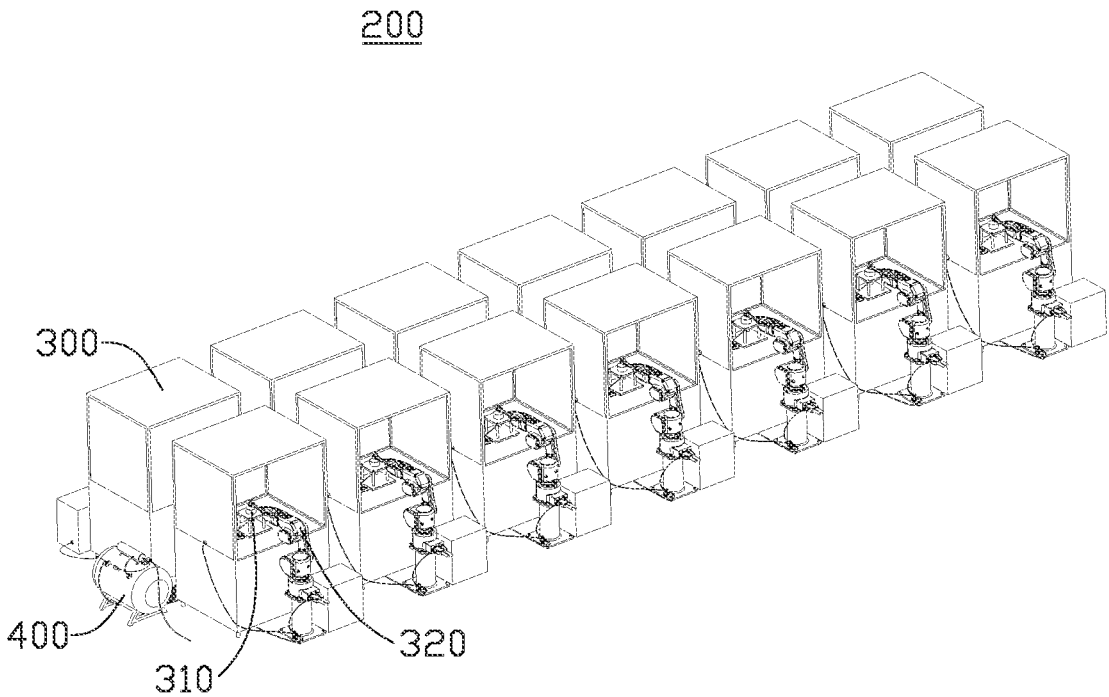
FIG. 3 is a schematic view of a suction system according to an embodiment of the present disclosure.

Referring to FIG. 3, a second embodiment of the present application provides a suction system 200, including at least one adsorption device 300, at least one vacuum switching valve 100, a negative pressure tank 400, a silencer cylinder 500, and a solenoid valve 600. The at least one vacuum switching valve 100 is connected with the at least one adsorption device 300. The negative pressure tank 400 is connected to the air inlets 121 on the vacuum switching valves 100. The negative pressure tank 400 is provided with a compressing air port 410 for compressing air to enter the negative pressure tank 400. The silencer cylinder 500 is arranged between the negative pressure tank 400 and the vacuum switching valves 100. The solenoid valve 600 is arranged at the compressing air port 410, configured to control the entry of compressed air.

It should be noted that the adsorption device 300 can be an adsorption claw, an adsorption disk, or other parts with adsorption function, and negative pressure in the vacuum path of the vacuum switching valve 100 can be formed by the negative pressure tank 400. The negative pressure tank 400 in one embodiment achieves vacuum by pumping compressed air.

Figure 4:
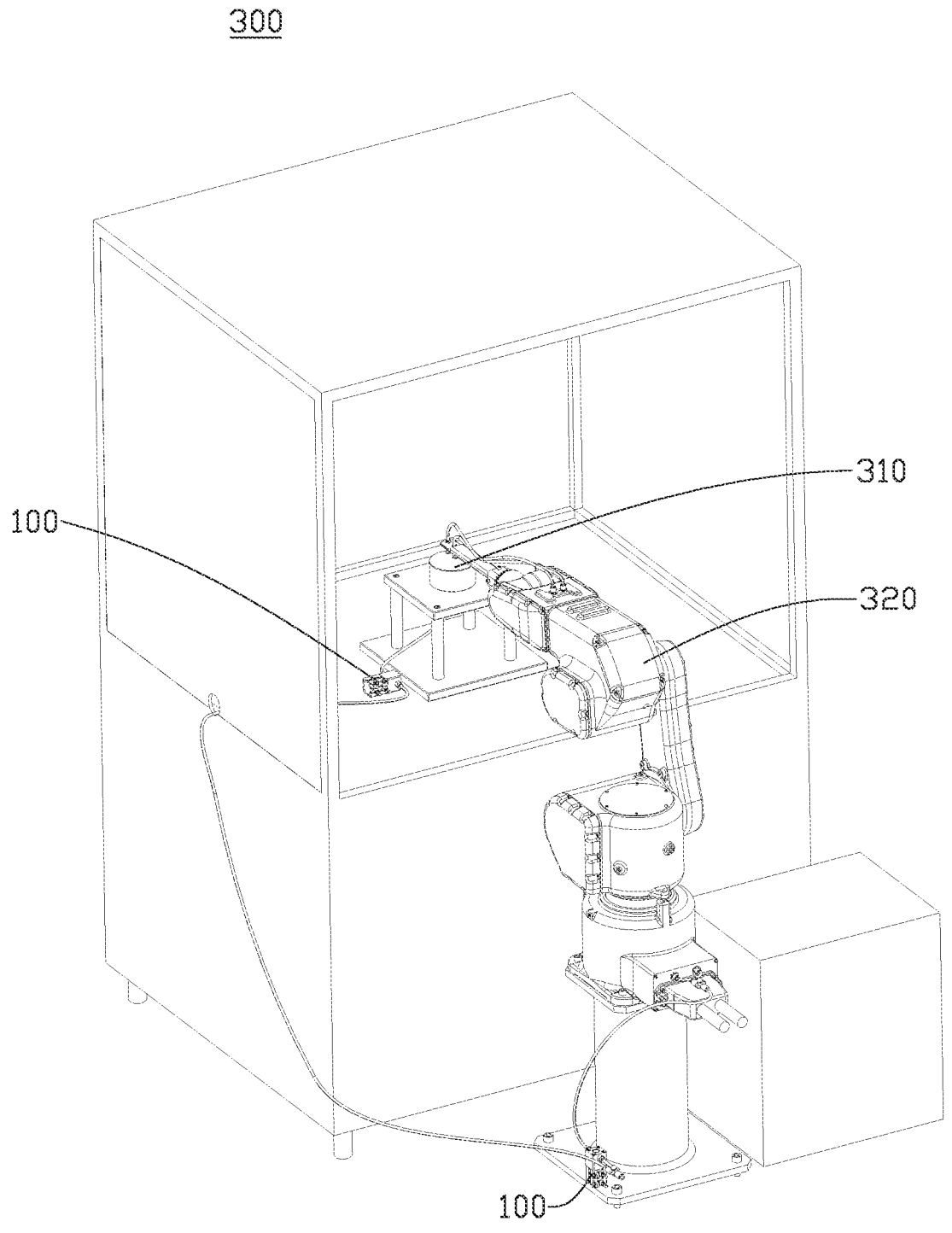
FIG. 4 is a schematic view of an adsorption device of the suction system in FIG. 3.

In one embodiment, the suction system 200 may include a plurality of adsorption devices 300, as shown in FIG. 4, each adsorption device 300 is provided with two adsorption points, one for an adsorption fixture 310 for fixing product, and the other for a robot arm 320 for sucking product, so that two vacuum switching valves 100 are provided for each adsorption device 300. Each vacuum switching valve 100 is connected to the negative pressure tank 400, and the negative pressure tank 400 provides unified negative pressure to each vacuum switching valve 100.

Figure 5:
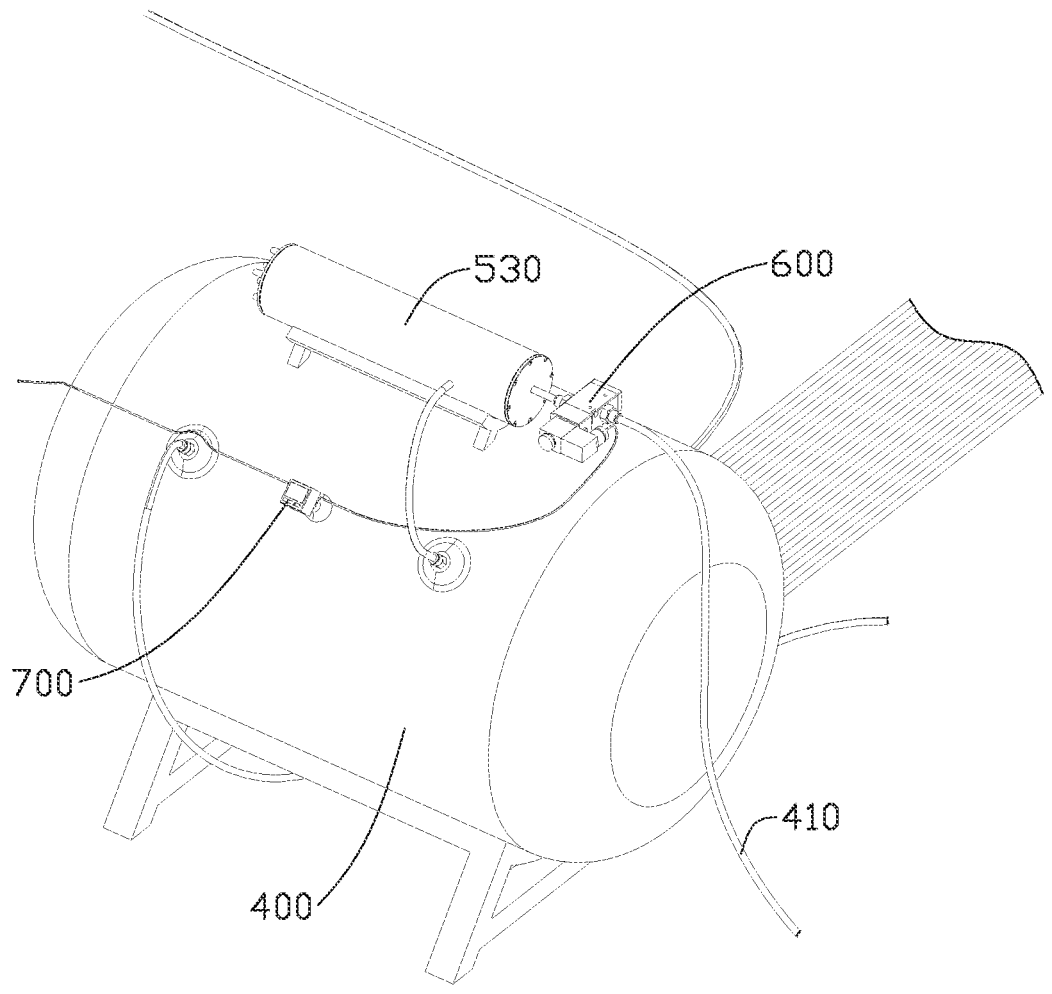
FIG. 5 is schematic view of a negative pressure tank of the suction system in FIG. 3.

Refer to FIG. 5, in one embodiment, the suction system 200 further includes a pressure monitoring device 700. The pressure monitoring device 700 is connected to the negative pressure tank 400 and the solenoid valve 600, for controlling a pressure inside the negative pressure tank 400. When the pressure monitoring device 700 detects that the negative pressure is insufficient, it will control an opening of the solenoid valve 600 and control a gas flow of the vacuum generator 520 in the silencer cylinder 500, so that the pressure value in the negative pressure tank 400 can reach a preset value, ensure quality of the concentrated pressure supply of the negative pressure tank 400, and reduce the suction frequency of the negative pressure system, thus reducing the noise of the working environment.

Figure 6:
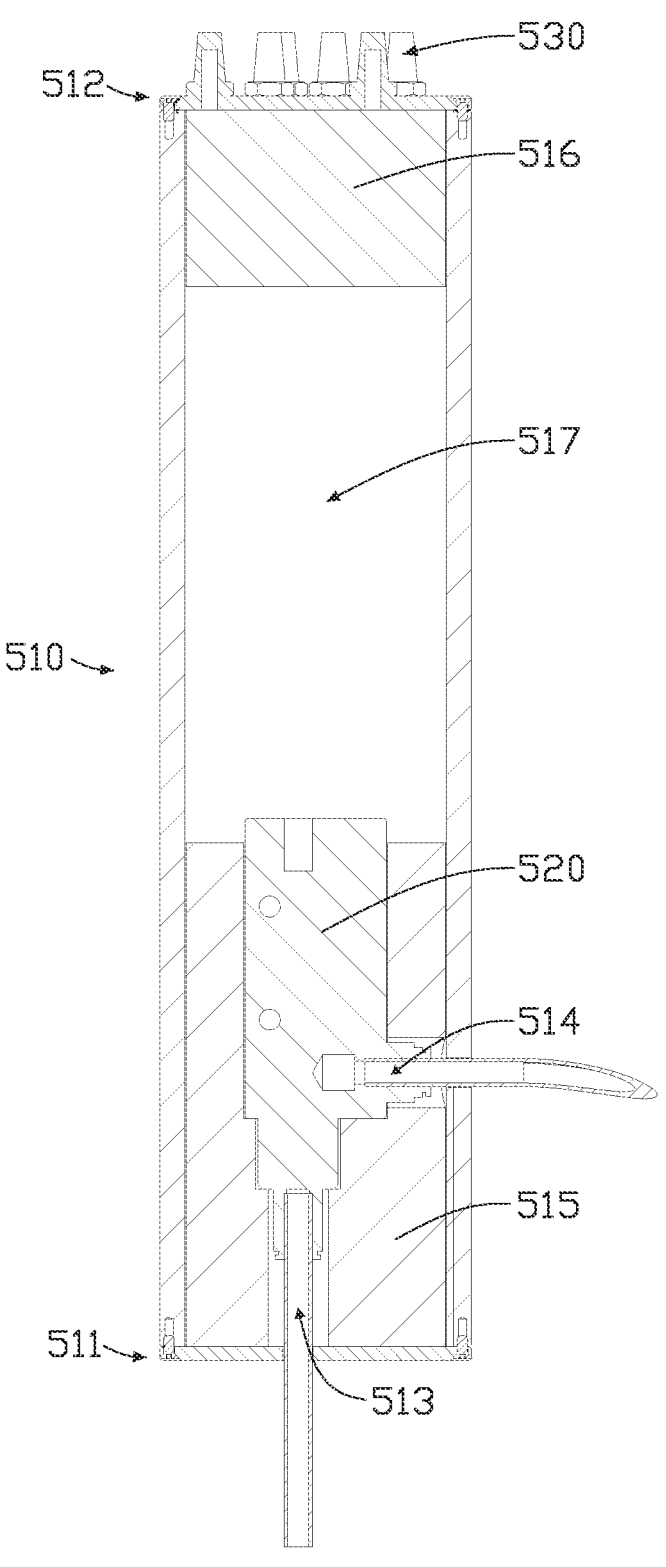
FIG. 6 is a cross-sectional view of an internal structure of a silencer of the suction system in FIG. 3.

Referring to FIG. 6, in an embodiment, the silencer cylinder 500 includes a cylinder body 510, a vacuum generator 520, a first sound insulation element 515, a second first sound insulation element 516, a sound insulation layer 517, and a muffler 517. The cylinder body 510 may adopt a tube such as a PC tube, and the cylinder body 510 includes a first end portion 511 and a second end portion 512 arranged opposite to each other. The vacuum generator 520 is arranged in the cylinder body 510 and near the first end portion 511 for vacuum extraction. An intake hole 513 and an outlet hole 514 are defined on the cylinder body 510. The intake holes 513 and the outlet hole 514 are respectively connected with the vacuum generator 520. The first sound insulation element 515 is arranged inside the cylinder body 510 close to the first end portion 511 and covers the vacuum generator 520. The second sound insulation element 516 is arranged inside the cylinder body 510 and near the second end portion 512. The sound insulation layer 517 is arranged between the first sound insulation element 515 and the second sound insulation element 516. The muffler 530 is arranged at an outer side the second end portion 512 of cylinder body 510. The silencer cylinder 500 can effectively reduce the noise caused by the rapid flow of air when the vacuum generator 520 is pumped, and reduce the noise pollution of the working environment. The vacuum generator 520 in an embodiment of the application can provide a negative pressure value of 0.77 bar, and a negative pressure value can be used at an adsorption end of the adsorption device 300 is 0.60 bar.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A vacuum switching valve, comprising:
a valve body, comprises a first end and a second end arranged opposite to each other, the second end is provided with an air inlet, an air outlet, and a through hole;
a valve element, the valve element is movable and arranged in the valve body;
a cylinder, the cylinder is connected to the first end and the valve element, and the cylinder is configured to drive the valve element to move in the valve body to close or open the air inlet; and
a stopper, the stopper passes through the through hole, and the stopper comprises a third end and a fourth end arranged opposite to each other, the third end is connected to the valve element, the fourth end is located on a side of the through hole away from the valve element, and the fourth end is configured to close or open the through hole, wherein
when the valve element moves to drive the fourth end to close the through hole, the air inlet is opened, and the air outlet is communicated with the air inlet, and
when the valve element moves to drive the fourth end to open the through hole, the valve element closes the air inlet, and the air outlet is communicated with the through hole.

2. The vacuum switching valve as claimed in claim 1, wherein, the valve body is provided with an intake channel, an outlet channel, and a connection channel, the intake channel is connected with the air inlet and the valve body, the outlet channel is connected with the air outlet and the valve body, and the connection channel is connected with the outlet channel and the through hole.

3. The vacuum switching valve as claimed in claim 2, wherein, the stopper is moved between a first position and a second position, when the stopper is moved to the first position, the intake channel is communicated with the outlet channel, and the through hole is blocked by the stopper; when the stopper is moved to the second position, the valve element blocks the intake channel, and the outlet channel is communicated with an outside environment through the through hole.

4. The vacuum switching valve as claimed in claim 3, wherein, when the stopper is moved to the first position, a maximum distance between the valve element and the intake channel in a first direction is 2 mm to 3.5 mm.

5. The vacuum switching valve as claimed in claim 1, wherein, the valve element comprises a gasket, the gasket is arranged on a side of the valve element near the second end of the valve body.

6. The vacuum switching valve as claimed in claim 1, wherein, the valve element comprises a first sealing ring, the first sealing ring is sleeved on a periphery of the valve element, and the first sealing ring abuts against an inner wall of the valve body.

7. The vacuum switching valve as claimed in claim 1, wherein, the valve body comprises a second sealing ring, the second sealing ring is arranged at the through hole, and the second sealing ring abuts against the stopper.

8. A suction system, comprising:
at least one adsorption device;
at least one vacuum switching valve, the at least one vacuum switching valve is connected to the at least one adsorption device;
a negative pressure tank, the negative pressure tank is connected with the at least one of the vacuum switching valve, and the negative pressure tank is provided with a compressing air port for compressing air to enter the negative pressure tank;
a silencer cylinder, the silencer cylinder is arranged between the negative pressure tank and the at least one vacuum switching valve; and
a solenoid valve, the solenoid valve is arranged at the compressing air port for controlling entry of the compressed air;
the at least one vacuum switching valve comprises:
a valve body, comprises a first end and a second end arranged opposite to each other, the second end is provided with an air inlet, an air outlet, and a through hole;
a valve element, the valve element is movable and arranged in the valve body;
a cylinder, the cylinder is connected to the first end and the valve element, and the cylinder is configured to drive the valve element to move in the valve body to close or open the air inlet; and
a stopper, the stopper passes through the through hole, and the stopper comprises a third end and a fourth end arranged opposite to each other, the third end is connected to the valve element, the fourth end is located on a side of the through hole away from the valve element, and the fourth end is configured to close or open the through hole, wherein when the valve element moves to drive the fourth end to close the through hole, the air inlet is opened, and the air outlet is communicated with the air inlet, and when the valve element moves to drive the fourth end to open the through hole, the valve element closes the air inlet, and the air outlet is communicated with the through hole.

9. The suction system as claimed in claim 8, further comprising:
a pressure monitoring device, wherein the pressure monitoring device is connected to the negative pressure tank and the solenoid valve for controlling a pressure in the negative pressure tank.

10. The suction system as claimed in claim 8, wherein, the silencer cylinder comprises:
a cylinder body, the cylinder body comprises a first end portion and a second end portion arranged opposite to each other;
a vacuum generator, the vacuum generator is arranged in the cylinder body and near the first end portion;

an intake hole and an outlet hole, the intake hole and the outlet hole are connected with the vacuum generator;

a first sound insulation element, the first sound insulation element is arranged in the cylinder body and covers the vacuum generator;

a second sound insulation element, the second sound insulation element is arranged in the cylinder body and near the second end portion;

a sound insulation layer, the sound insulation layer is arranged between the first sound insulation element and the second sound insulation element; and a muffler, the muffler is arranged at an outer side of the second end portion of the cylinder body.

11. The suction system as claimed in claim 8, wherein, the valve body is provided with an intake channel, an outlet channel, and a connection channel, the intake channel is connected with the air inlet and the valve body, the outlet channel is connected with the air outlet and the valve body, and the connection channel is connected with the outlet channel and the through hole.

12. The suction system as claimed in claim 11, wherein, the stopper is moved between a first position and a second position, when the stopper is moved to the first position, the intake channel is communicated with the outlet channel, and the through hole is blocked by the stopper; when the stopper is moved to the second position, the valve element blocks the intake channel, and the outlet channel is communicated with an outside environment through the through hole.

13. The suction system as claimed in claim 12, wherein, when the stopper is moved to the first position, a maximum distance between the valve element and the intake channel in a first direction is 2 mm to 3.5 mm.

14. The suction system as claimed in claim 8, wherein, the valve element comprises a gasket, the gasket is arranged on a side of the valve element near the second end of the valve body.

15. The suction system as claimed in claim 8, wherein, the valve element comprises a first sealing ring, the first sealing ring is sleeved on a periphery of the valve element, and the first sealing ring abuts against an inner wall of the valve body.

16. The suction system as claimed in claim 8, wherein, the valve body comprises a second sealing ring, the second sealing ring is arranged at the through hole, and the second sealing ring abuts against the stopper.

* * * * *